United States Patent [19]

Deininger

[11] 4,203,292
[45] May 20, 1980

[54] HYDRAULIC AUXILIARY POWER STEERING WITH ENERGY SUPPLY ARRANGEMENT

[75] Inventor: Horst Deininger, Bettringen, Fed. Rep. of Germany

[73] Assignee: Zahnradfabrik Friedrichshafen, AG., Friedrichshafen, Fed. Rep. of Germany

[21] Appl. No.: 940,130

[22] Filed: Sep. 6, 1978

[30] Foreign Application Priority Data

Sep. 22, 1977 [DE] Fed. Rep. of Germany ....... 2742621

[51] Int. Cl.² ............................................... F16H 39/46
[52] U.S. Cl. ......................................... 60/445; 60/494; 91/446; 91/468; 60/459
[58] Field of Search ................. 60/459, 494, 445, 451, 60/452, 465; 91/446, 448, 468

[56] References Cited

U.S. PATENT DOCUMENTS

| | | | |
|---|---|---|---|
| 3,411,416 | 11/1968 | Herd et al. | 60/468 X |
| 3,455,210 | 7/1969 | Allen | 91/446 |
| 3,999,386 | 12/1976 | Crull et al. | 60/494 X |

*Primary Examiner*—Edgar W. Geoghegan
*Attorney, Agent, or Firm*—Zalkind & Shuster

[57] ABSTRACT

A pressurized fluid supply for an auxiliary power steering system includes a regulator valve assembly controlling the output pressure of a fluid supply pump under the opposing influences of the pump discharge pressure and a signal feedback pressure from a fluid operated servomotor. An adjustable bias applied to the regulator valve assembly establishes a low idling discharge pressure for the pump while no steering action is being performed by the servomotor to which the pump is connected by a control valve biased to a flow blocking position.

10 Claims, 6 Drawing Figures

4,203,292

HYDRAULIC AUXILIARY POWER STEERING WITH ENERGY SUPPLY ARRANGEMENT

BACKGROUND OF THE INVENTION

This invention relates to a hydraulic auxiliary power steering system applicable to automotive vehicles in particular as well as to marine craft.

Generally, the auxiliary power system includes a mechanical connection between the manually operated mechanism or steering wheel and the steered parts of the vehicle such as the traction wheels or a rudder, in addition to the power reinforcement provided by a source of auxiliary power. In one type of such auxiliary power steering system, a pressurized fluid supply always provides the maximum operating pressure required. A control valve is provided having a closed, central position blocking the discharge line from the high pressure pump. When there is no steering action, only leakage fluid flows through the control valve under the maximum pressure to which the pump is limited by a pressure limiting valve. Also, upon attaining maximum pressure, the fluid delivered by the high pressure pump drains into a reservoir tank. Both of the foregoing processes are accompanied by considerable fluid losses. Further, the maximum pressure is not necessary for most steering operations especially steering during vehicle travel. Therefore, there is an energy loss because of the lower level of energy required for most steering actions.

It is therefore an important object of the present invention to provide a hydraulic auxiliary power steering system wherein its fluid power supply in a state of rest when no steering action occurs, generates a low pressure as compared to the customary high operating pressures provided during steering action, the low pressure being increased, however, during a steering action to the required value.

SUMMARY OF THE INVENTION

In accordance with the present invention, the fluid power supply associated with an auxiliary power steering system has a high pressure pump, the discharge pressure of which is controlled by a regulator valve assembly under the joint influences of a pump feedback pressure force and the opposing summation of two variable command forces consisting of a higher force corresponding to the operating pressure in the steering servomotor and a lower force corresponding to an adjustable idling bias. As a result of the lower command variable, an adjusted idling pressure is established at the outlet of the high pressure pump whenever no steering action takes place. This idling pressure may, for example, be 10 BAR. The higher variable corresponding to the pressure in the servomotor depends on the one hand on the reactive force from the steered parts to the servomotor and on the other hand on the displacement of the control valve by the actuating mechanism. The sum of the two command variables determines the increase in the discharge pressure of the high pressure pump from the low idling value, effected by the regulator valve assembly. The high pressure pump is therefore adjusted only to meet the steering demands when supplying fluid to the servomotor. Since the higher pressure on the pump side of the control valve is increased from the low idling pressure value, the pressure gradient and the loss of energy in the control valve is very small.

Contrary to previously known auxiliary power steering systems, according to the present invention losses occur only as a result of fluid leakage under the low idling pressure and from volumetric losses of the high pressure pump. During a steering action, only the product of operating flow volume and the low idling pressure constitutes the unused capacity of the fluid supply. Thus, under both the idling and steering conditions, the power loss amounts to only a small percent of the power loss occuring in previously known auxiliary power steering systems.

A further advantage of the present invention resides in avoiding use of storage chambers and associated charging valves. Also, in prior systems, the control valve construction necessary to handle the continuously applied high pump pressures required very narrow tolerances, clearances and sealing gaps and sharp valve passage edges. Such valve construction precision is required to a considerably lesser degree according to the present invention because the control valve need only handle a low pressure gradient.

According to one embodiment of the invention, the regulator valve assembly controls pump discharge pressure by throttling the intake duct to the high pressure pump.

In another embodiment, whenever the servomotor or the steering linkage reaches a terminal position and the output of the high pressure pump reaches its maximum operating pressure, the pressure limiting valve drains fluid from the servomotor signal pressure line in order to reduce the drain flow of fluid and the power losses. The same power loss reducing action occurs whenever a steering demand requires the maximum pressure of the high pressure pump as a result of high resistances. Thus, even under maximum pump pressure conditions, a drop in pressure occurs at the control valve to reduce the signal pressure applied from the servomotor to an actuating surface of the regulator valve assembly enabling the regulator to continue throttling the intake flow to the high pressure pump. The foregoing drop in pressure across the control valve is accomplished by insertion of a flow restrictor into the signal pressure line between the servomotor and the actuating surface of the regulator so that the actuating surface is acted upon with a lower pressure than that applied by the pump output to the opposing actuating surface. Consequently, full flow from the high pressure pump is no longer returned by the maximum pressure limiting valve to the reservoir tank but rather a considerably smaller flow determined by the size of the flow restrictor. Power is thereby conserved and undesirable fluid circulation is prevented. Also, the maximum pressure limiting valve need not be designed for handling the entire pump stream and may therefore be reduced in size.

According to another embodiment of the invention, the maximum pressure limiter may be housed in the regulator piston valve resulting in a considerable savings in constructional costs.

According to yet another embodiment, the regulator valve assembly mechanically acts on a structural part of the high pressure pump which thereby exerts a force on the regulator under the influence of the pressure produced by the high pressure pump. Such a regulator may be accommodated in a constructionally simple manner within the housing of a rotary slide vane type of pump.

BRIEF DESCRIPTION OF DRAWING FIGURES

DETAILED DESCRIPTION OF PREFERRED EMBODIMENTS

First Embodiment

Figure 1:
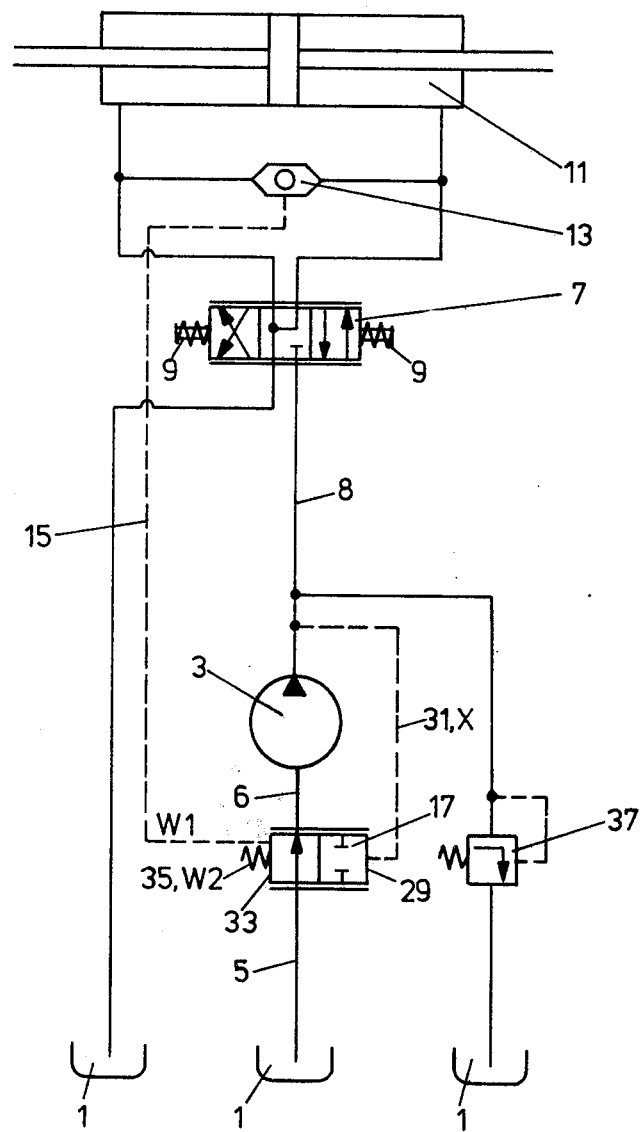
FIG. 1 is a circuit diagram of a first embodiment of the invention wherein a regulator throttles the intake to a high pressure pump.

According to a first embodiment of the invention illustrated in FIG. 1, an operating fluid medium is obtained from a reservoir tank 1. A high pressure pump 3 draws the fluid from the tank 1 through intake duct sections 5 and 6 and feeds it through a high pressure pump line 8 to a control valve 7 shown in a central or neutral flow-blocking position. The control valve is held in its flow blocking position by springs 9 and may be displaced therefrom by a valve actuating mechnism 40 (FIG. 3) such as a hand steering wheel, against the bias of the springs 9. When displaced from the central position, the valve 7 conducts pressurized fluid to one of the operating pressure chambers of a servomotor 11 causing volumetric expansion thereof. A balancing valve 13 of a well known type is connected in parallel with the servomotor so that its inflow chambers are always in fluid communication with the operating chambers of the servomotor 11 while its control pressure space is connected to a regulator valve assembly 17 through a feedback pressure signal line 15.

Figure 2:
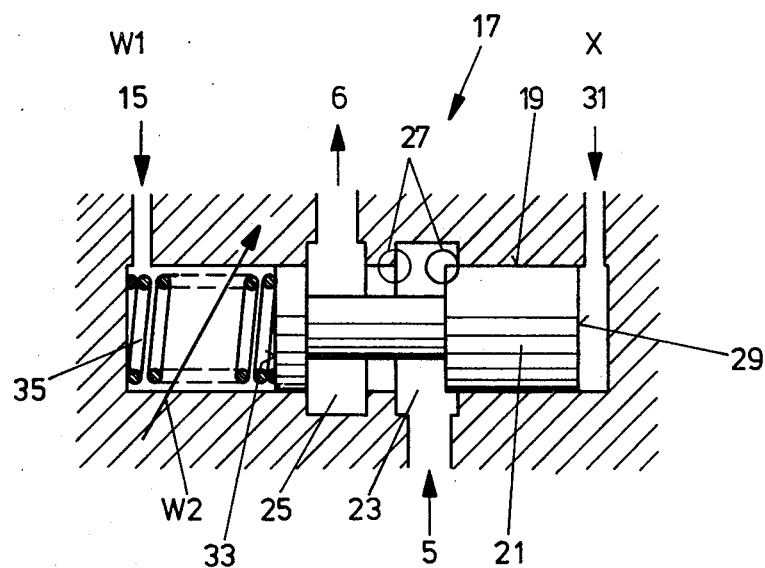
FIG. 2 shows an axial piston valve in longitudinal section serving as a regulator.

The regulator valve assembly 17 includes an axial piston valve 21 as shown in FIG. 2. The piston valve 21 is displaceable within a cylindrical bore of a valve body 19. The valve body has an annular inlet port 23 and an outlet port 25, said ports being respectively connected to the duct sections 5 and 6 of the pump intake line. A valve passage formed between these ports may be throttled by a pair of edges 27 on the valve body and the piston valve. The piston valve has an actuating surface 29 subjected to the fluid in high pressure line 8 through a pump feedback line 31. An opposed actuating surface 33 of the regulator 17 is exposed to fluid from the balancing valve through the servomotor feedback line 15. In addition, a compression spring 35 acts on actuating surface 33, and has a bias which is adjustable by any well known means symbolically depicted by an arrow W2 in FIG. 2. Also shown in FIG. 1 is a relief jet valve 37 interconnected between the high pressure line 8 and the tank 1 for limiting the discharge pressure of the pump 3 at a maximum permissible output value of 180 BAR, for example.

The regulator valve assembly 17 as depicted in FIG. 2, acts through its valve passage controlling portions 27 to restrict inflow from the intake duct section 5 to the high pressure pump 3 and is jointly controlled for this purpose by three influences. The first influence is a command variable W1 in the form of an operating pressure prevailing in one of the operating chambers of the servomotor 11 fed to the regulator through the pressure signal line 15. A second influence is a command variable W2 in the form of the adjustable bias of the compression spring 35 by means of which a low idling pressure of 10 BAR, for example, is established in the pump pressure line 8. the third influence X for the regulator is in the form of the discharge pressure of the high pressure pump 3 transmitted by pump feedback pressure line 31 to the pressure face 29 of the regulator.

When no steering action takes place and the control valve 7 is in its central position, the high pressure line 8 is blocked and the signal pressure transmitted by line 15 is zero. Only then may the discharge pressure of pump 3 become so high as to shift the piston valve 21 to the left, as viewed in FIG. 2, by means of the actuating surface 29 against the bias of compression spring 35 until valve portions 27 throttle the intake duct sections 5 and 6. With proper adjustment of the compression spring 35, a low idling pressure of 10 BAR will prevail in the discharge pressure line 8 as long as there is no steering action.

When the control valve 7 is shifted by its actuating mechanism from the flow blocking position shown, the high pressure pump 3 delivers pressurized fluid to one of the chambers of the servomotor 11. The pressure in the servomotor rises and acts through the balancing valve 13 and signal line 15 on the actuating surface 33 of the regulator 17. The axial piston valve 21 is consequently displaced to the right as viewed in FIG. 2 fully opening the valve passage between the intake duct sections 5 and 6. The pressure in the high pressure line 8 may then rise to the maximum value permitted by the relief jet valve 37. The valve passage of the regulator valve assembly 17 is blocked on the other hand only when a low idling pressure is established in the high pressure line 8 higher than the pressure in the expanding chamber of the servomotor 11.

Figure 3:
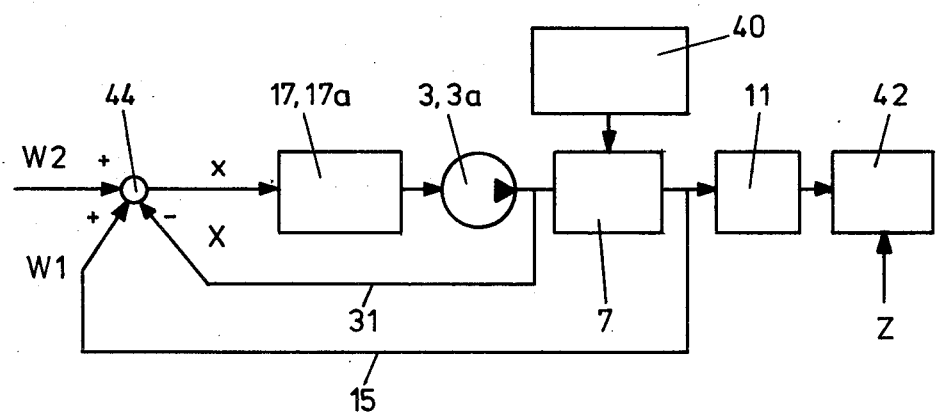
FIG. 3 is a block diagram of the regulating and control circuit.

The axial piston valve 21 of the regulator valve assembly 17 as shown in FIGS. 1 and 2, functions as a regulator in conjunction with a control circuit as depicted in FIG. 3. When the control valve 7 is actuated in a known manner by its actuating mechanism 40, the servomotor 11 is operated and the steered parts of the vehicle are displaced against loading forces Z, such as road bed forces on a land vehicle or the water action on a rudder of a marine craft. The piston valve 21 of the regulator valve assembly 17 forms a comparator 44 by virtue of its two actuating surfaces 29 and 33, the adjustable bias of the spring 35 acting as the command variable W2 and the pressure signal from the pressurized chamber of the servomotor 11 acting as the command variable W1. The sum of the influences exerted by the two variables W1 and W2 is balanced by the negative influence X applied in the form of a pump discharge pressure signal from line 31. The foregoing regulating action is accomplished in the first embodiment of FIGS. 1 and 2 by throttling the fluid supply of the high pressure pump 3 as herein described.

Second Embodiment

Figure 4:
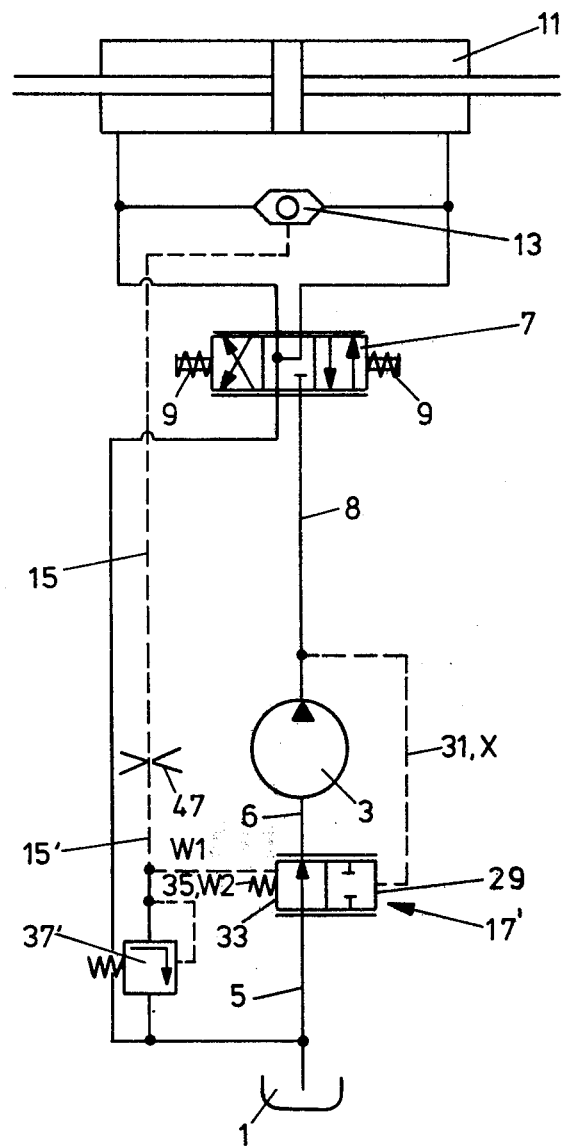
FIG. 4 is a circuit diagram of a second embodiment of the invention.

A second embodiment as shown in FIG. 4, differs from the first embodiment in that a flow restrictor 47 is inserted into the pressure signal line 15—15' extending between the balancing valve 13 and the actuating surface 33 of a regulator valve assembly 17'. A relief valve 37' is connected to the line 15'.

Figure 5:
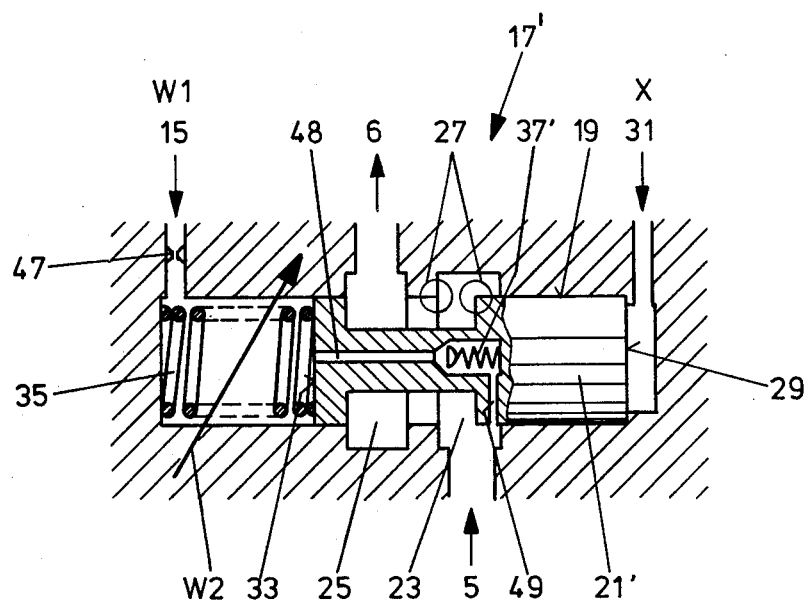
FIG. 5 shows the axial piston valve of FIG. 2 in further partial section.

As shown in FIG. 5, the relief valve 37' is housed in the piston valve 21' of the regulator valve assembly 17'.

The inlet chamber of the relief valve 37' is connected to the spring chamber of the axial piston valve by means of a channel 48. The outflow chamber of the relief valve 37' is connected to the intake duct 5 by means of a channel 49. The channel 49 is so located that it remains open during the entire operation of the regulator valve assembly 17'.

When the servomotor 11 or the steering linkage connected thereto reaches the terminal position, or whenever an extremely high resistance is to be overcome by the steering action, a maximum discharge pressure of the high pressure pump 3 is applied to the expanding chamber of the servomotor 11. In the embodiment of FIG. 1, a drop in pressure at the control valve 7 can no longer occur under maximum discharge pressure conditions so that both actuating surfaces 29 and 33 of the regulator valve assembly 17 are acted upon by the same pressure. the bias of the spring 35 acting on the actuating surface 33 then holds the regulator valve assembly in a position preventing any throttling of the intake flow to the pump 3. In the second embodiment of FIG. 4, however, a drop in pressure does not occur at the flow restrictor 47 even under maximum pump discharge pressure conditions. The actuating surface 33 is therefore then influenced by a lower pressure than that acting on the actuating surface 29. If the pressure differential exceeds the idling pressure corresponding to the bias of spring 35, the regulator valve assembly 17' throttles the intake flow to the high pressure pump 3. Thus, fluid flow produced by the high pressure pump is then conducted by restrictor 47 at the idling pressure level of 10 BAR for example, and the pressure in the expanding chamber of the servomotor is maintained constant above the opening pressure of the relief valve 37'.

Third Embodiment

Figure 6:
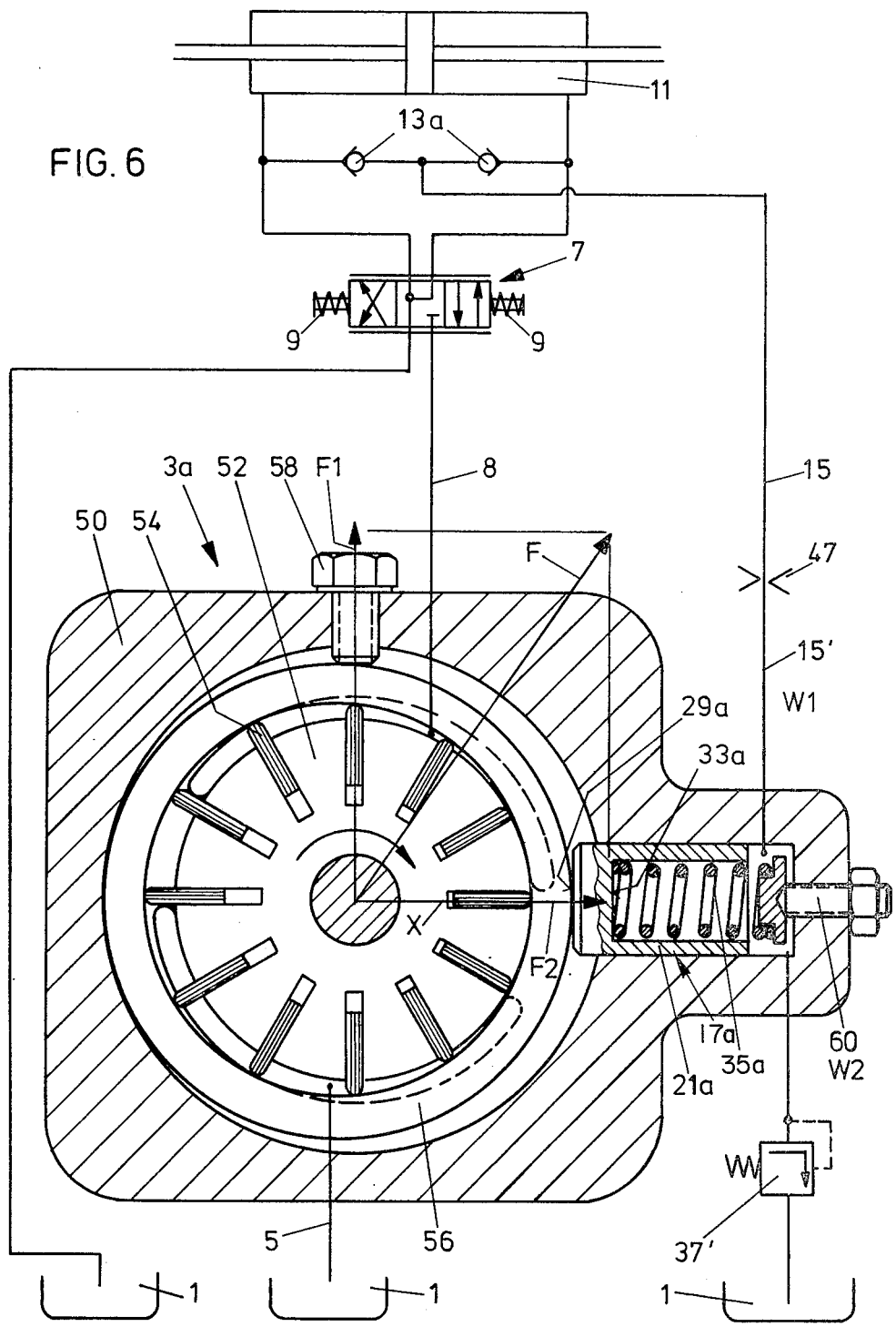
FIG. 6 is a circuit diagram of a third embodiment of the invention.

A third embodiment as shown in FIG. 6, operates on the same principle as the second embodiment, deviating therefrom in certain details. In this embodiment, the intake duct 5 of the high pressure pump 3a is not throttled. Instead, the discharge pressure produced by the pump is changed by mechanical adjustment of the pump stroke. The high pressure pump 3a is in the form of a rotary slide vane type of pump having a rotor 52 carrying slide vanes 54, and an eccentric ring 56 housed in a known manner within a housing 50. The rotor rotates in a clockwise direction as shown by the arrow in FIG. 6 and consequently delivers fluid to the high pressure line 8. At the same time, a force F is exerted on the eccentric ring 56. The force vector representing the force F is more simply if not accurately shown originating from the center of the rotor 52 for the sake of clarity. The force F may be split into two components F1 and F2 wherein the component F1 is resisted by a screw 58 projecting into the housing. The active component F2 on the other hand acts on a piston valve 21a of the regulator valve assembly 17a through the eccentric ring, displacing the piston valve 21a within a cylinder bore to the right against the bias of a spring 35a. The predetermined bias of the spring 35a may be adjusted by means of screw 60. Also, two one-way check valves 13a are provided having the same effect as balancing valve 13 hereinbefore described with respect to the other embodiments.

The pressure prevailing in pressure signal line 15' on one side of the flow restrictor 47 serves as the command variable W1 applied through line 15' while the bias of spring 35a serves as command variable W2. The regulating influence X is the force component F2 exerted by eccentric ring 56 on the piston valve 21a. When no steering takes place and the control valve 7 is in its central, flow-blocking position, the pressure in line 15—15' is zero. Therefore only the external force of spring 35a acts on the eccentric ring and moves it almost to its central position so that only the low idling pressure of 10 BAR, for example, is produced in line 8.

When steering takes place there is a considerably higher pressure in line 15 causing piston valve 21a to displace the eccentric ring 56 further to the left as viewed in FIG. 6 producing a higher pressure in line 8 in accordance with steering demands. The flow restrictor 47 and the relief valve 37' in this embodiment, serve the same functions as described with respect to the second embodiment of FIG. 4.

What is claimed is:

1. In a power steering system having a fluid supply which includes an intake duct (5, 6) connected to a high pressure pump (3, 3a) supplying operating fluid limited to a maximum discharge pressure by a pressure limiting valve (37, 37') and a control valve (7) displaceable from a flow-blocking position by an actuating mechanism to operate a servomotor (11) having operating pressure chambers, the improvement residing in regulator means (17, 17', 17a) connected to the intake duct for controlling the discharge pressure of the high pressure pump as a function of one influence (x) balanced by the sum of two command variables (W1, W2), and signal means for establishing a higher one of said variables (W1) normally corresponding to the operating pressure prevailing one of the pressure chambers of the servomotor, the other of said variables (W2) corresponding to a relatively lower adjustable idling bias.

2. In a power steering system having a fluid supply including an intake duct (5, 6) connected to a high pressure pump (3, 3a) supplying operating fluid limited to a maximum discharge pressure by a pressure limiting valve (37, 37') and a control valve (7) displaceable from a flow-blocking position by an actuating mechanism to operate a servomotor (11) having operating pressure chambers, the improvement residing in regulator means (17, 17', 17a) for controlling the discharge pressure of the high pressure pump as a function of one influence (x) balanced by the sum of two command variables (W1, W2), and signal means for establishing a higher one of said variables (W1) normally corresponding to the operating pressure pevailing in one of the pressure chambers of the servomotor, the other of said variables (W2) corresponding to a relatively lower adjustable idling bias, the regulator means (17) including valve passage means (27) for throttling inflow of the fluid to the high pressure pump (3) through the intake duct.

3. The combination of claim 2 wherein the regulator means further includes an axial piston valve (21, 21') having two opposing pressure actuating surfaces (29, 33), the discharge pressure of the high pressure pump being applied to one of the actuating surfaces (29) as said influence (x) and the relatively higher variable corresponding to the pressure prevailing in said one of the pressure chambers of the servomotor being applied by signal means to the other of the actuating surfaces (33), and means (35) for exerting said adjustable idling bias on the piston valve in the same sense as said higher variable to establish a relatively low idling pump pressure.

4. The combination of claim 3 including flow restrictor means (47) transmitting the higher variable corresponding to the prevailing pressure in said one of the pressure chambers of the servomotor to the other of the actuating surfaces, and means (15') connecting said flow restrictor means to said pressure limiting valve (37').

5. The combination of claim 4 wherein said pressure limiting valve is housed in the axial piston valve (21') of the regulator means (17'), said pressure limiting valve having an inlet chamber connected to the other of the actuating surfaces and an outflow chamber continuously connected to the intake duct.

6. The combination of claim 1 wherein the regulator means (17a) mechanically controls operation of the high pressure pump for controlling the discharge pressure.

7. The combination of claim 6, wherein the regulator means includes a piston valve (21a), spring means (35a) biasing the piston valve in one direction, fluid actuating means (29a, 33a) urging the piston valve in an opposite direction with a force (F) corresponding to the discharge pressure of the high pressure pump and the opposing variable corresponding to the pressure prevailing in said one of the pressure chambers of the servomotor.

8. The combination of claim 1 wherein the regulator means includes an axial piston valve having two opposing actuating surfaces (29, 33), the discharge pressure of the high pressure pump (3) being applied to one of the actuating surfaces (29) as said influence (x), flow restrictor means (47) transmitting the higher variable corresponding to the prevailing pressure in one of the pressure chambers of the servomotor to the other of the actuating surfaces (33), and means (35) for exerting said adjustable idling bias on the piston valve (21, 21a) in the same sense as said higher variable to establish a relatively low idling pressure.

9. In a fluid pressure supply system for a power steering servomotor (11) to which fluid is supplied by a pump (3) through a control valve (7) having a neutral, flow-blocking position, the improvement residing in pressure regulating means (17, 17', 17a) for varying pump operating pressure as a function of servomotor steering demand, including valve means (21, 21a) for volumetrically controlling discharge flow of the fluid from the pump to regulate said pump operating pressure, pressure feedback operating means (15, 31) operatively connected to the valve means for varying the pump operating pressure to meet said steering demand, and idling bias means (35, 35a) operative on the valve means for substantially reducing the pump operating pressure in the absence of steering demand, whereby energy losses resulting from pump idling operation is minimized.

10. The system as defined in claim 9 including a fluid reservoir (1) connected to the pump by the valve means.

* * * * *

UNITED STATES PATENT AND TRADEMARK OFFICE
CERTIFICATE OF CORRECTION

PATENT NO. : 4,203,292
DATED : May 20, 1980
INVENTOR(S) : HORST DEININGER

It is certified that error appears in the above-identified patent and that said Letters Patent are hereby corrected as shown below:

Column 6, line 33, insert before "one" -- in --.

Signed and Sealed this

Twenty-second Day of July 1980

[SEAL]

Attest:

SIDNEY A. DIAMOND

Attesting Officer

Commissioner of Patents and Trademarks